Feb. 13, 1968          L. J. LANE              3,369,171
                       CONTROL CIRCUITS
Original Filed Sept. 12, 1962              6 Sheets—Sheet 1
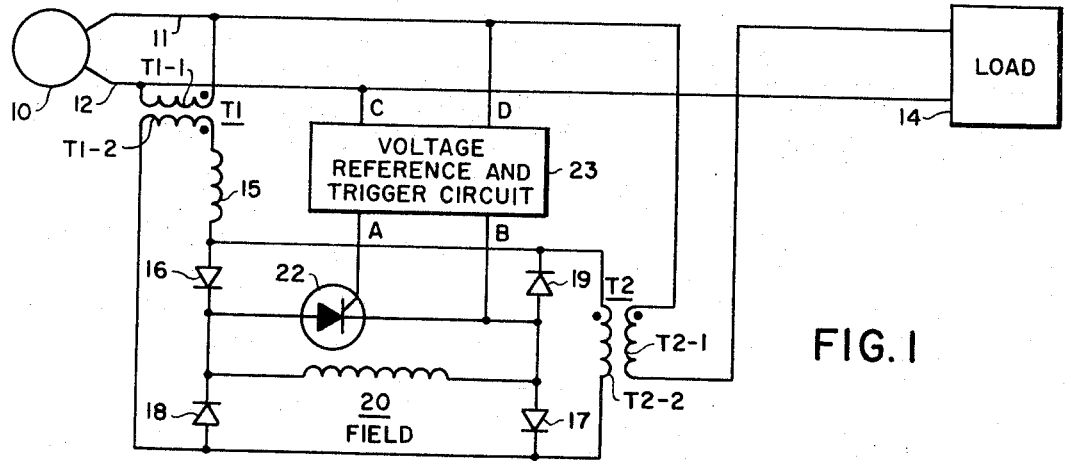
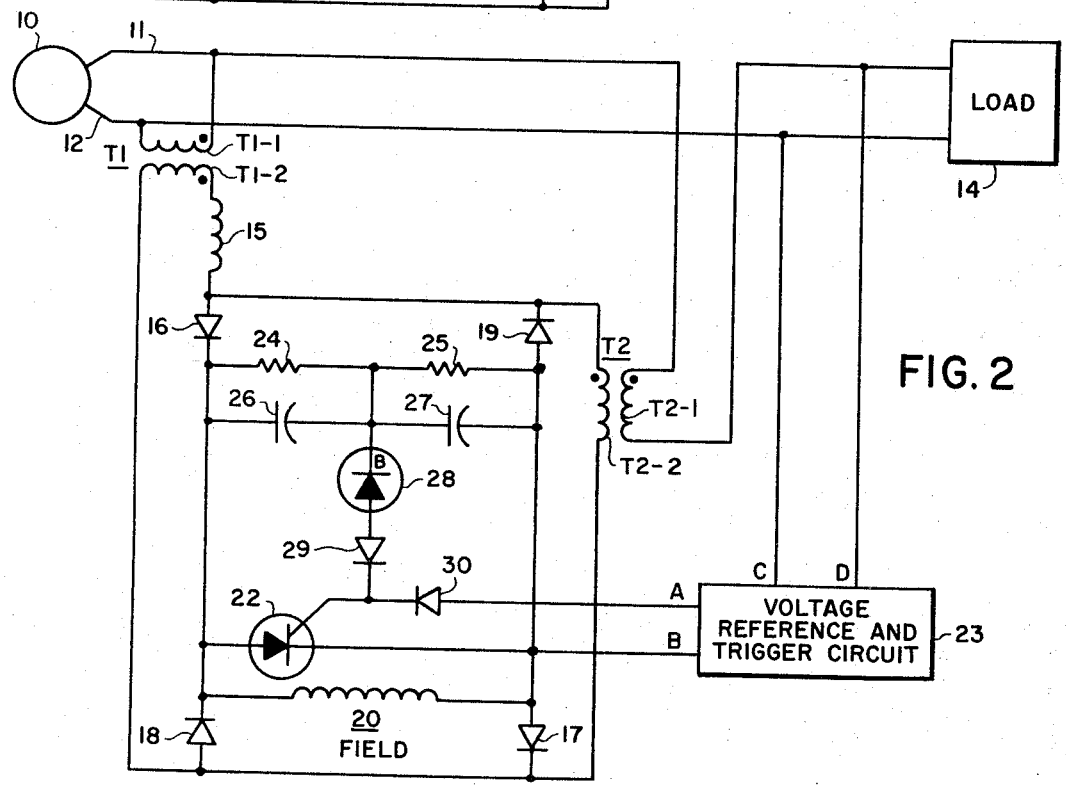
INVENTOR.
LAWRENCE J. LANE
BY
*Robert R. Strack*
ATTORNEY Feb. 13, 1968 L. J. LANE 3,369,171
CONTROL CIRCUITS
Original Filed Sept. 12, 1962 6 Sheets-Sheet 3

INVENTOR.
LAWRENCE J. LANE
BY
*Robert R Strack*
ATTORNEY

Feb. 13, 1968 L. J. LANE 3,369,171

CONTROL CIRCUITS

Original Filed Sept. 12, 1962 6 Sheets-Sheet 4

INVENTOR.
LAWRENCE J. LANE
BY
Robert P. Strack
ATTORNEY

Feb. 13, 1968   L. J. LANE   3,369,171
CONTROL CIRCUITS

Original Filed Sept. 12, 1962   6 Sheets-Sheet 6

INVENTOR.
LAWRENCE J. LANE
BY
*Robert P Strack*
ATTORNEY

_United States Patent Office_ 3,369,171
Patented Feb. 13, 1968

3,369,171
CONTROL CIRCUITS
Lawrence J. Lane, Stuarts Draft, Va., assignor to General Electric Company, a corporation of New York
Continuation of application Ser. No. 223,016, Sept. 12, 1962. This application Mar. 30, 1966, Ser. No. 538,866
18 Claims. (Cl. 322—68)

This is a continuation of application Serial No. 223,016 filed Sept. 12, 1962, now abandoned.

This invention relates to generator control circuits and more particularly, to excitation systems for self-excited dynamoelectric machines.

Several features are highly desirable in any excitation system. One of these features relates to means for insuring start-up of the generator from a zero condition to a rated condition utilizing only the residual magnetism of the field. Another important feature relates to the ability of the excitation system to control the generator and prevent equipment damage even in the presence of a short circuit. Still another feature relates to the degree of universality of use a particular excitation system provides. In other words, it is advantageous to have a single excitation system that will control the field of a generator from a zero current condition; that will properly control such a field during short circuits; and that can be used with a large variety of alternators.

An object of the present invention is to provide an improved exciter system embodying the characteristics of automatic startup, ability to sustain a short circuit, and universality of application.

Obviously, the effectiveness of any regulation and control system is dependent upon the particular circuit configurations adopted and these in turn are dependent upon the elements employed in the system. Relatively recent developments in the semiconductor art have furnished numerous components having extremely high reliability and life expectancy. These components, due to their construction, are also of light weight and small size and may be assembled in small, easily handled packages. Further, semiconductor elements having fast switching qualities, such as for instance, the silicon controlled rectifier, make it possible to develop control systems having exceptionally fast response time.

Another object of the present invention is to provide an improved self-excited generator control system utilizing silicon controlled rectifiers.

Another object of the invention is to provide means for removing the power applied to the field of the generator for controlled time intervals in accordance with the amount of deviation in output voltage or current from preselected limits.

Still another object of the invention is to provide means operative in the event of excessive current from the generator to remove the field excitation.

The invention is embodied in a plurality of illustrative circuits, each of which shows the use of controlled rectifiers to either directly short out a generator field winding or to short out the supply thereto, under the control of a voltage regulation circuit. In the following specific embodiments both single phase circuits and three phase circuits are shown; however, it is understood that the principles and teachings of the invention are applicable also to other polyphase equipment.

In accordance with the embodiments, the voltage from at least one phase of a generator output is applied to a rectifying means via a reactor. The rectifying means supplies unidirectional current to the field of the generator under the control of a switching means; the switching means having a duty cycle determined by a voltage regulation and triggering circuit. The current in at least one phase of the generator output is also applied to the aforementioned rectifying means to provide field excitation. Thus, the field may be jointly supplied by the voltage and current output of the generator. Selective triggering of the switching means provides good regulation of the generator output.

The novel features of the invention are set forth with particularity in the appended claims. The invention itself, however, both as to its organization and method of operation, together with further objects and features thereof, may best be understood by reference to the following description taken in conjunction with the accompanying drawings wherein:

FIGURE 1 is a circuit schematic of an embodiment of the invention using a silicon controlled rectifier in parallel with the field of a self-excited generator to control field excitation in accordance with the output of the generator;

FIGURE 2 is a circuit schematic of an embodiment of the invention using a silicon controlled rectifier in parallel with the field of a self-excited generator and including a supplementary triggering circuit which develops a triggering impulse for the controlled rectifier in the event of a generator fault;

Figure 3:
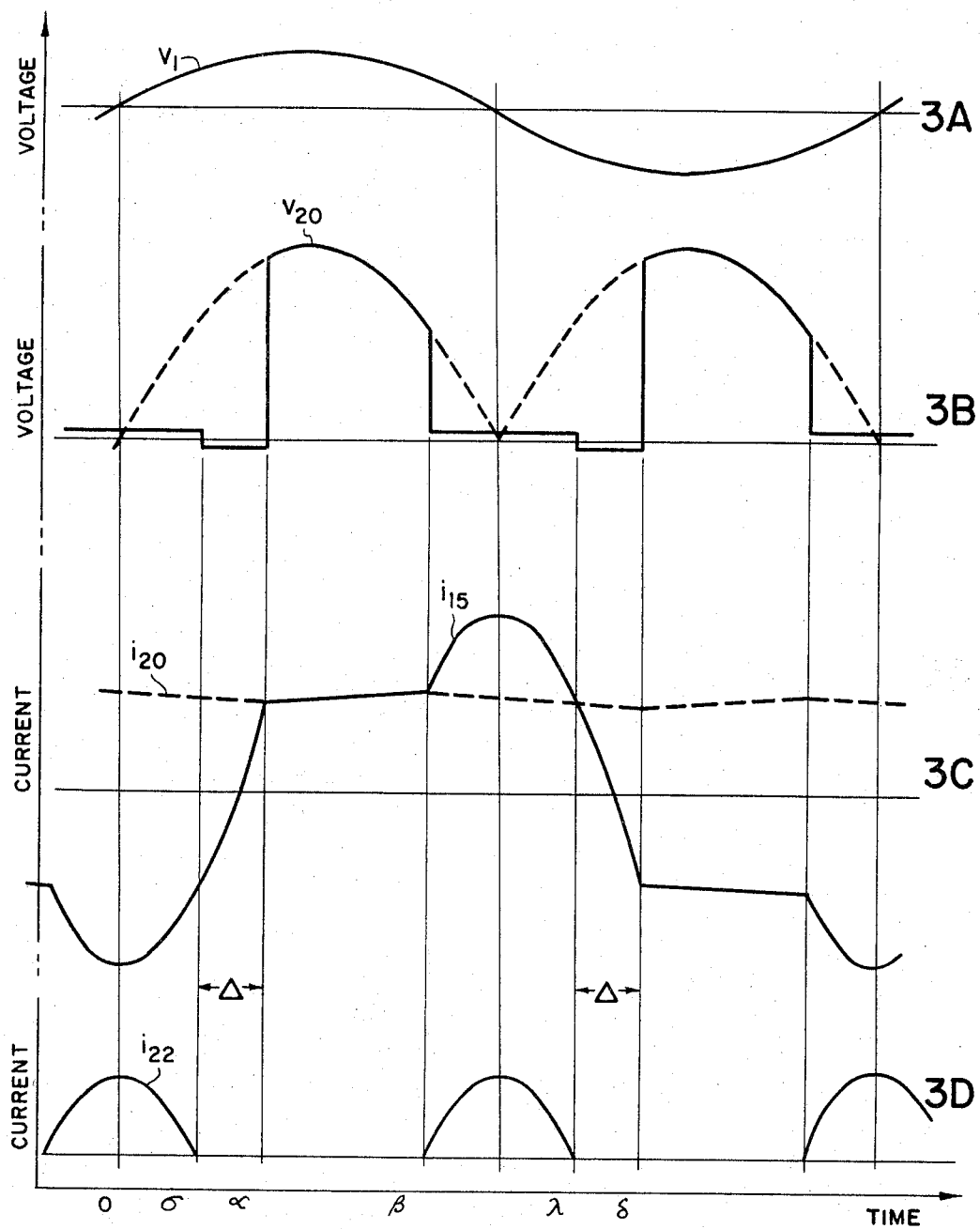
Figure 4:
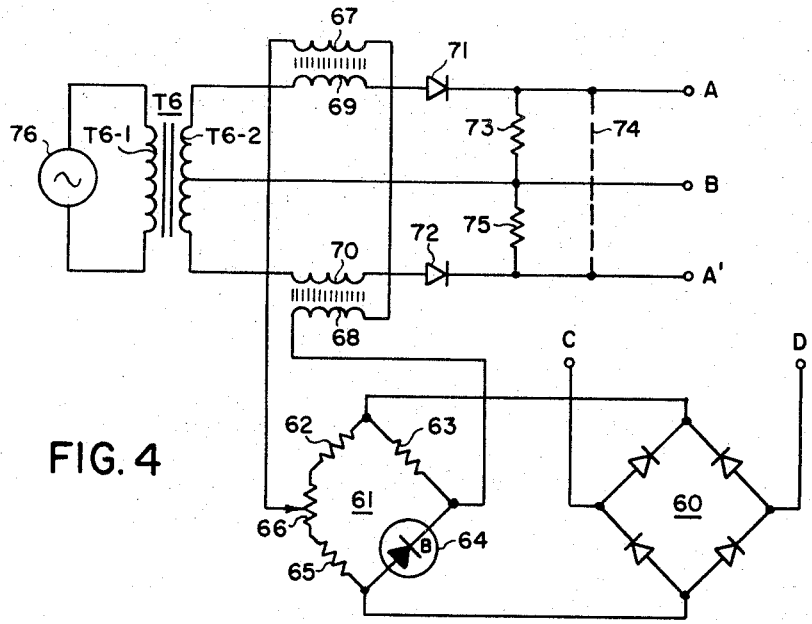
Figure 11:
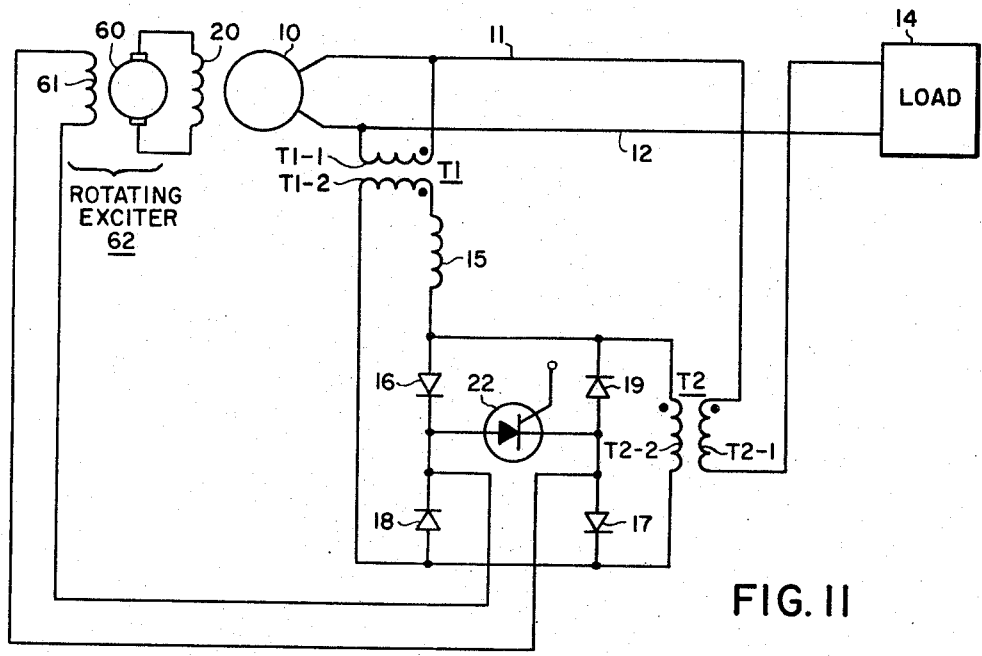
Figure 5:
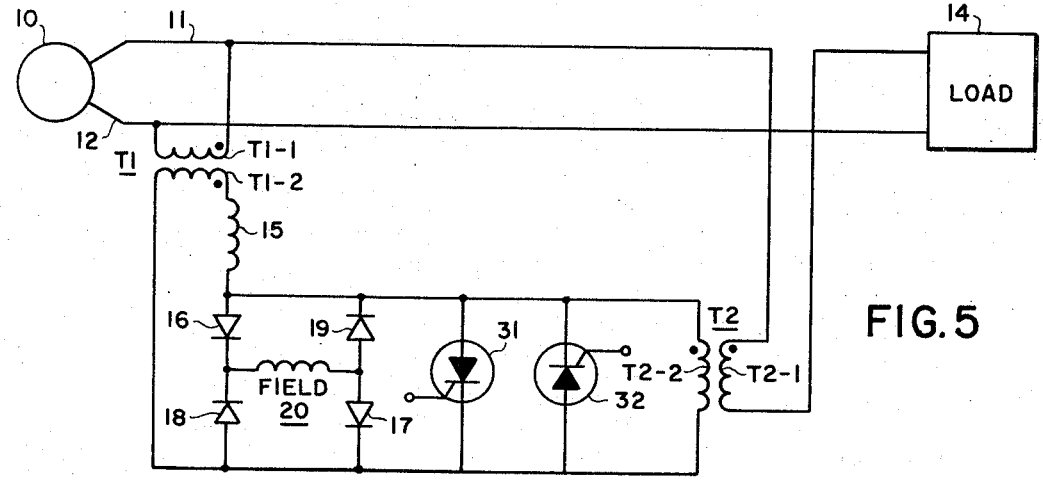
Figure 6:
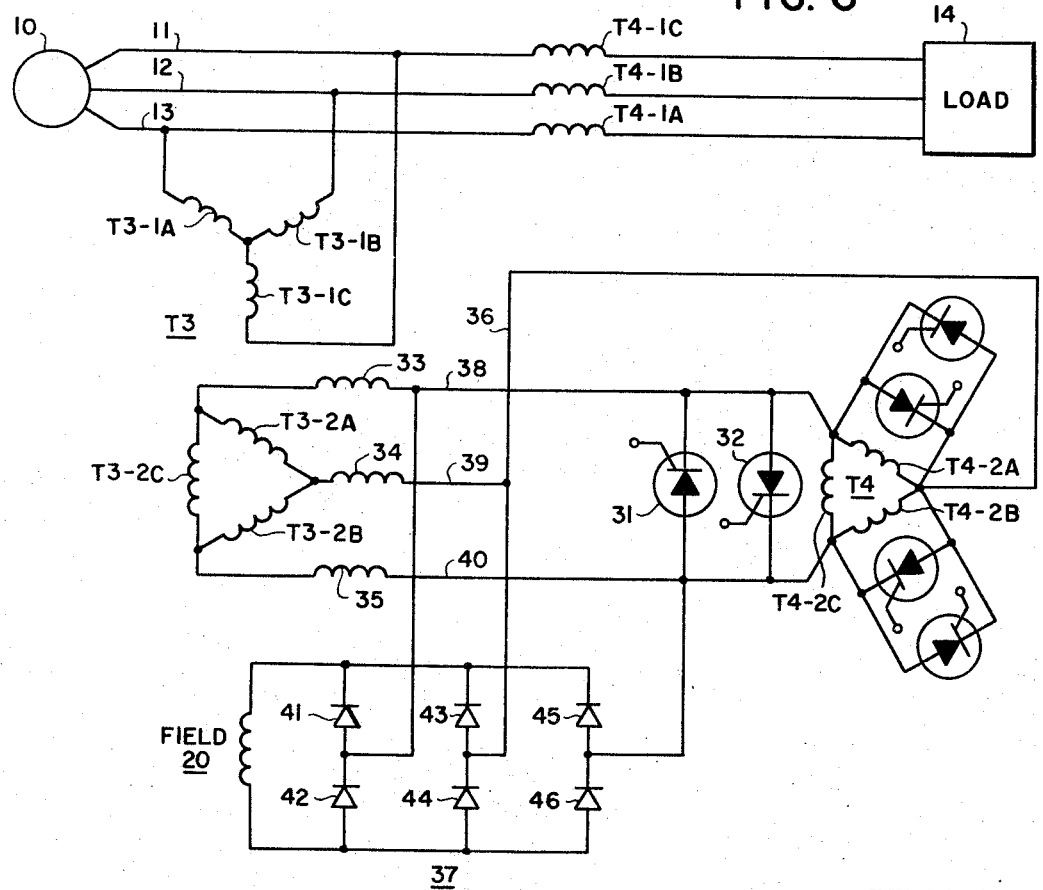
Figure 7:
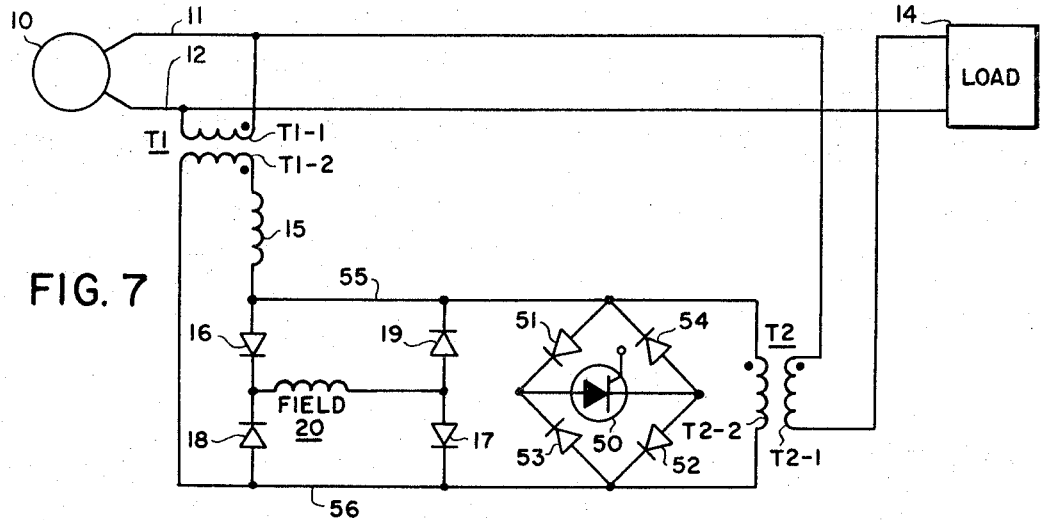
Figure 8:
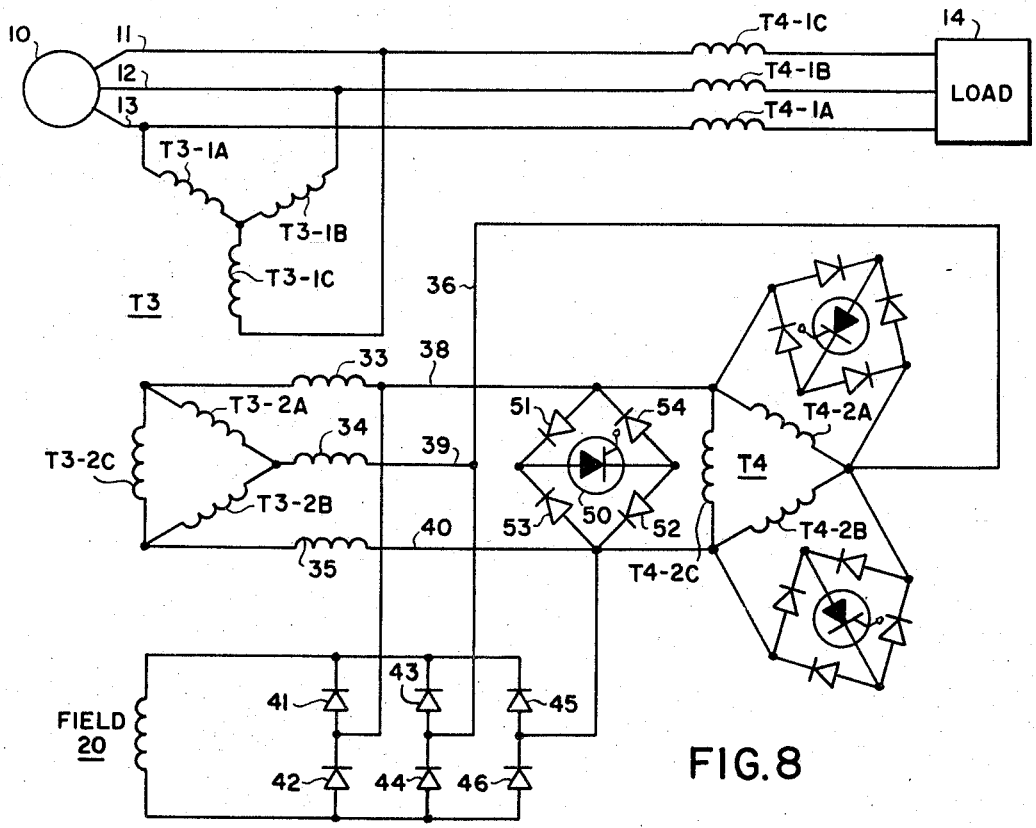
Figure 9:
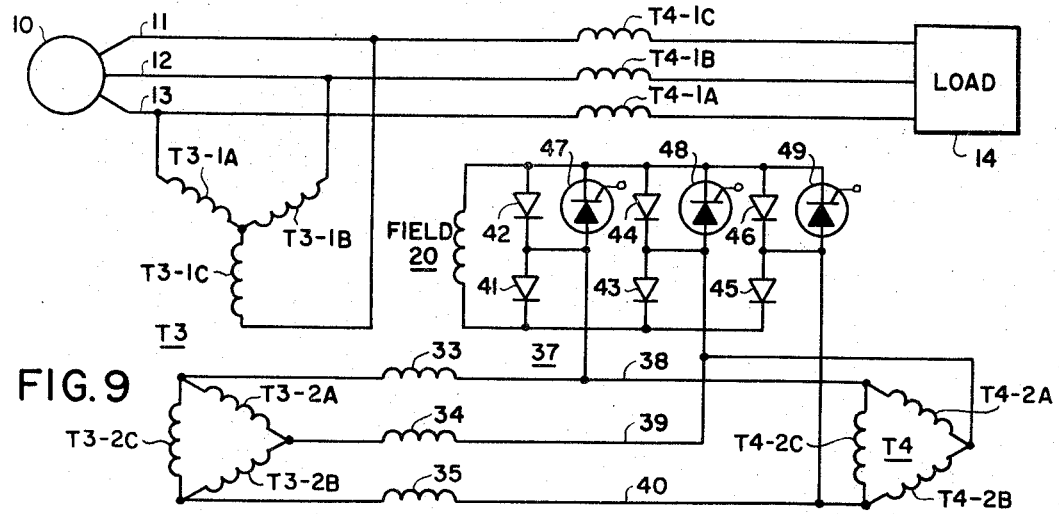
Figure 10:
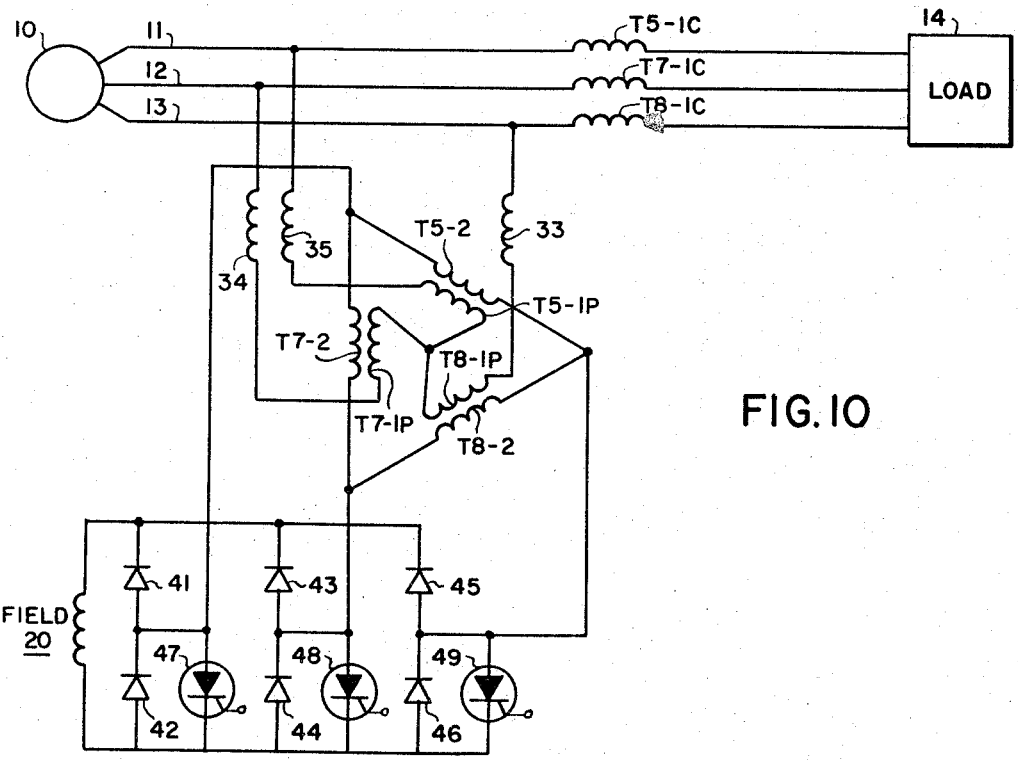

FIGURE 3 comprises illustrative voltage and current waveforms representing conditions at selected points in the circuit of FIGURE 1;

FIGURE 4 is a circuit schematic of a typical voltage reference and triggering circuit suitable for use with the embodiments of the invention;

FIGURE 5 is a circuit schematic of an embodiment of the invention wherein a pair of silicon controlled rectifiers are connected to selectively short circuit a bridge rectifier which supplies direct current to the field of a self-excited generator;

FIGURE 6 is a circuit schematic of a modification of the embodiment shown in FIGURE 5 wherein each phase of a three-phase generator is individually monitored and used to supply excitation current;

FIGURE 7 is a circuit schematic of an embodiment of the invention wherein a single silicon controlled rectifier in combination with a conventional rectifier bridge is connected to selectively short circuit a bridge rectifier which supplies direct current to the field of a self-excited generator;

FIGURE 8 is a circuit schematic of a modification of the embodiment shown in FIGURE 7 wherein each phase of a three-phase generator is individually monitored and used to supply excitation current;

FIGURE 9 is a circuit schematic of an embodiment of the invention wherein individual phase regulation is accomplished by using a single controlled rectifier individually associated with each phase of a three-phase fullwave rectifying bridge circuit;

FIGURE 10 is a circuit schematic of an embodiment of the invention wherein three current potential transformers are used in conjunction with the silicon controlled rectifier arrangement shown in FIGURE 9; and FIGURE 11 is a circuit schematic of the invention showing its use in conjunction with a rotating exciter arrangement.

Throughout the following detailed consideration of the various embodiments of the invention, the same numerical designations are employed for similar elements within each figure.

In order to simplify the illustration of each embodiment, the voltage reference and triggering circuit used to control the triggering of the silicon controlled rectifiers is generally not shown. An exception to this presentation appears in FIGURES 1 and 2 where block 23 represents such a circuit. The specific circuit of FIGURE 4 may be adapted, as discussed hereinafter, to function as the voltage reference and triggering circuit; however, it is not wished to be limited to this specific circuit. Any number of circuits for comparing the output with a reference and developing triggering signals in accordance with deviations therefrom are known to those skilled in the art. For example, the "Silicon Controlled Rectifier Manual," second edition, copyrighted 1961 by the General Electric Company, discloses a number of such triggering circuits.

FIGURE 1 represents a basic use of silicon controlled rectifiers as switching elements in accordance with the unique concepts of the present invention. It is characteristic of silicon controlled rectifiers that current conduction occurs under a forward-biasing condition when either a breakdown voltage is attained or a triggering potential is applied between the gate and cathode thereof. Once current conduction commences, an extremely low impedance path is presented between the anode and cathode terminals and this path remains available until a reversebias is placed thereacross. The instant invention utilizes silicon controlled rectifiers individually or in oppositely oriented pairs to selectively establish short circuits at selected points in an exciter system at times calculated to control the output of the associated generator.

In FIGURE 1 a generator 10 supplies three-phase power over lines 11 and 12 to a load 14. The voltage across the output from generator 10 is applied to the primary of a potential transformer T1 and the current in line 11 is directed through the primary of a current transformer T2. In addition, a voltage reference and trigger circuit 23 develops time positioned control signals in accordance with the deviations of the voltage across the generator output from a preselected value. The field 20 of generator 10 receives full-wave power developed by a rectifying bridge which is supplied by the generator output via transformers T1 and T2. A silicon controlled rectifier 22 is connected in parallel with field 20 and is controlled by voltage reference and trigger circuit 23 to selectively short circuit field 20 for periods of time determined by the deviation of the output voltage from the preselected value.

The specific circuit connections of the full-wave rectifying bridge may be described by considering the bridge a closed series circuit comprising respectively, the anode-cathode path of rectifier 16, the cathode-anode path of rectifier 18, the cathode-anode path of rectifier 17, and the anode-cathode path of rectifier 19. The input to the bridge is applied between the junction of rectifiers 16 and 19 and the junction of rectifiers 17 and 18. The output of the bridge appears between the junction of rectifiers 16 and 18 and the junction of rectifiers 17 and 19. Thus, field 20 is connected between the output terminals of the rectifying bridge, and the secondary windings T1-2 and T2-2 of the potential and current transformers respectively, are both connected between the input terminals. In the case of the potential transformer connection, a reactor 15 is included in series with the connecting leads. The important functions of reactor 15 are described hereinafter in conjunction with a detailed consideration of the circuit operation.

FIGURE 3 presents typical voltage and current waveforms at selected points in the illustrative circuits during a cycle of operation. As shown, the waveforms represent the instantaneous output voltage of a single phase $v_1$, the instantaneous field voltage $v_{20}$, the instantaneous field current $i_{20}$, the instantaneous current in reactor 15, $i_{15}$, and the instantaneous current in controlled rectifier 22, $i_{22}$. Consideration of FIGURE 3 in conjunction with FIGURE 1 provides an understanding of circuit operation in general, and the operation of the circuit of FIGURE 1 in particular.

Assume that the generator is initially unconnected to load 14. Under this condition, when the generator is rotated by a prime mover (not shown), the residual magnetism of field 20 causes the generation of a relatively small voltage which is effective via potential transformer T1, reactor 15, and the full-wave rectifying bridge, to apply a voltage to field 20. The enhanced field increases the output voltage and this in turn further increases the field energization in cumulative fashion until the no load output level is reached. Initially, the voltage reference and trigger circuit 23 does not generate a control signal and consequently, controlled rectifier 22 remains nonconductive. Once the operating range is achieved, the voltage reference and trigger circuit produces control signals for establishing the proper duty cycle of controlled rectifier 22 to achieve the desired output.

During a typical cycle of operation, after the normal operating range is attained, an instantaneous voltage having the sinusoidal waveform $v_1$ in FIGURE 3A is developed across secondary T1-2. This voltage is applied via reactor 15 to the rectifier bridge circuit and appears as a full-wave rectified voltage across field 20. Waveform $v_{20}$ in FIGURE 3B represents the instantaneous voltage across field 20. The inherent inductance of field windings, such as 20, causes smoothing of the rectified input and a substantially constant amplitude field current $i_{20}$ results.

Obviously, although the field current $i_{20}$ is substantially constant, the supply current flowing through reactor 15 must reverse direction in response to applied voltage $v_1$. Waveform $i_{15}$, in FIGURE 3C, represents this current. As shown, the reactor current $i_{15}$ lags voltage $v_{20}$ and a commutation angle $\alpha$ is required to fully reverse the direction of flow in response to changing voltage polarities. At some instant of time during each half cycle, controlled rectifier 22 is rendered conductive and establishes a low impedance path across field 20. While the controlled rectifier is in its low impedance state, the voltage across the field is generally equal to the small forward voltage drop thereacross.

At some point, 0, in time, applied voltage $v_1$ begins its positive half cycle. Prior to this time, silicon controlled rectifier 22 was rendered conductive by reference voltage and trigger circuit 23 and all current supplied to the rectifier bridge was flowing in the path comprising secondary T1-2, rectifier 18, the parallel combination of field 20 and controlled rectifier 22, rectifier 19, and reactor 15. As a result of the low forward impedance of the rectifiers substantially all of the applied voltage was impressed across reactor 15 during the prior time period and caused the magnitude of reactor current $i_{15}$ to exceed the magnitude of field current $i_{20}$.

From time 0 to $\alpha$ the changed polarity of voltage $v_1$ is effective to cause a commutation of the reactor current $i_{15}$ and at a time $\sigma$, controlled rectifier 22 stops conducting. From this time $\sigma$ until the field current $i_{20}$ is fully supplied by the reactor current $i_{15}$ at time $\alpha$, the field current "free-wheels" through rectifiers 17, 18, and 19, 16 creating a slight negative voltage across the field which is effective to reverse-bias the anode-cathode path of silicon controlled rectifier 22 and render it nonconductive.

When commutation is completed at $\alpha$, the full applied voltage appears across field 20. Reactor 15 now presents only a slight impedance because the current therethrough is virtually constant because of the high inductance of field 20. The supply circuit specifically includes: secondary T1-2, reactor 15, rectifier 16, field 20, and rectifier 17.

At a time $\beta$, voltage reference and trigger circuit 23 furnishes a control signal which triggers controlled rectifier 22 into conduction. This immediately shorts out field 20 and once again only the forward voltage drop of controlled rectifier 22 appears across it. The changed current path now includes only rectifier 16, the parallel combination of silicon controlled rectifier 22 and field 20, rectifier 17, secondary T1-2, and reactor 15. Until time $\delta$, when field current $i_{20}$ is fully supplied by reactor current $i_{15}$, substantially all applied voltage is again impressed across reactor 15. Thus, the instant of triggering of controlled rectifier 22 determines the amount of power delivered to field 20.

The previous circuit description was based upon the assumption that load 14 was unconnected. When load 14 is connected, the current induced in secondary winding T2–2 will cause an appreciable current to flow through the full-wave rectifying bridge to field 20. Obviously, the instant in time β, at which controlled rectifier 22 is fired by voltage reference and trigger circuit 23, is adjusted in order to maintain the generator terminal voltage substantially constant at a preselected value while both potential transformer T1 and current transformer T2 supply field excitation.

In the event of a short circuit on the output of generator 10, the voltage applied to potential transformer T1 becomes minimal. Experience indicates the desirability of field excitation during a short circuit fault. In the illustrated circuit, such excitation is available via current transformer T2. Of course, some circuit applications may find it advantageous to omit this current transformer. Nevertheless, the teachings of the instant invention are applicable.

The particular circuit means for generating the appropriate triggering impulse for the controlled rectifier 22 are not a part of the present invention. For convenience, however, one form of circuit adaptable thereto has been shown in FIGURE 4. This circuit will be seen to have five terminals A, A', B, C, and D. In the embodiments showing a block 23 for the voltage reference and trigger circuit, the output leads from this block are labeled in accordance with the circuit schematic of FIGURE 4. Many of the illustrative circuit schematics have been simplified by eliminating block 23. In these circuits it is well within the skill of those in the art to directly connect either a circuit such as shown in FIGURE 4 or an equivalent thereof.

The circuit of FIGURE 4 includes a rectifying bridge 60 adapted to be connected via terminals C and D across the output to be regulated. The full-wave rectified output from bridge 60 is applied to a reference bridge 61 wherein an error current is developed which is proportional to the deviation of the applied voltage from a preselected voltage level. The error current is employed to establish a saturation level in a self-saturating magnetic amplifier of the well-konwn "amplistat" variety, and in accordance of this saturation level, triggering impulses appears between the A and/or A' terminal and terminal B at an instant of time proportional to the deviation in voltage from the aforementioned preselected voltage level.

Voltage reference bridge 61 comprises the closed series circuit formed by a resistor 65, a potentiometer 66, a resistor 62, a resistor 63, and the cathode-to-anode path of a breakdown or voltage regulating diode 64. The full-wave rectified voltage from bridge 60 is applied with a positive polarization between the junction of resistors 62 and 63 and a negative polarization to the junction of resistor 65 and the anode of regulating diode 64. In view of these connections, an error voltage is produced between the slider of potentiometer 66 and the junction of resistor 63 and regulating diode 64 which is proportional to the deviation between the applied voltage and the fixed voltage drop across regulating diode 64. This error voltage is serially applied to the control windings 67 and 68 of the self-saturating magnetic amplifier circuit to create an initial saturation level.

As illustrated, the self-saturating magnetic amplifier configuration comprises two gate windings 69 and 70, and two control windings 67 and 68. Assuming conductor 74 is absent, each gate winding is serially connected with a rectifier 71 or 72 and a resistor 73 or 75 across a respective one-half of the center-tapped secondary T6–2 of transformer T6. The primary T6–1 of transformer T6 is energized by an alternating current source 76 which is synchronized with the output of generator 10.

In accordance with normal self-saturated magnetic amplifier operation, when no current exists in control windings 67 and 68, current in gate windings 69 and 70 produces saturation in the respective cores a predetermined time after application thereof, and a current pulse is furnished at terminals A or A', respectively. If a core is partially saturated in an aiding direction by current in the control winding, the current pulse will be produced in a shorter time than with a neutral core condition. On the other hand, if the core is partially saturated in an opposing direction by current in the control winding, the current pulse will be delivered at some time later than with a neutral core condition. The increase or decrease in time from the time required in a neutral core condition is directly proportional to the amount of partial saturation. In the instant embodiment, the partial saturation caused by the current in the control windings is proportional to the error voltage developed across the reference voltage bridge 61.

When pulses are desired every half cycle on the same lead, conductor 74 is inserted between the cathodes of rectifiers 71 and 72 and resistor 75 is deleted. With this modification in circuitry, pulses appear each half cycle between terminals A and B.

FIGURE 2 is a circuit schematic of an embodiment of the invention including means for protecting the excitation circuitry in the event of a fault on the output of the generator. This circuit is similar to that of FIGURE 1 with the addition of several elements which form a supplementary triggering circuit for silicon controlled rectifier 22. Obviously, a fault on the generator will cause higher than normal current in lines 11 and 12, and this, in turn, will induce a large voltage in the secondary T2–2 of the current transformer. Abnormally high voltages may damage the rectifiers 16, 17, 18, and 19 used in the full-wave rectifying bridge and consequently, means are provided for reducing the voltage magnitude. One protective arrangement would be to connect a nonlinear resistance such as Thyrite directly across secondary T2–2; however, this is a relatively expensive technique. In the illustrated circuit, a "Zener" or breakdown diode 28 is used.

In addition to the already discussed circuit elements present in FIGURE 1, FIGURE 2 includes a series connected pair of resistors 24, 25 connected in parallel with silicon controlled rectifier 22. Further, a series connected pair of capacitors 26, 27 is also connected in parallel with silicon controlled rectifier 22. The junctions between the resistor and capacitor pairs are connected together and a series circuit comprising Zener diode 28 and conventional rectifier 29 interconnects this common connection to the gate electrode of silicon controlled rectifier 22. The cathode of Zener diode 28 is connected to the common connection and the cathode of rectifier 29 is connected to the gate electrode. Thus, current flows to the gate electrode when the voltage at the common connection exceeds the voltage at the gate electrode by an amount equal to the breakdown potential of Zener diode 28. The regular triggering circuit comprising voltage reference and trigger circuit 23 is connected to the gate of controlled rectifier 22 by a conventional rectifier 30.

The Zener diode circuit is effective to supply a supplementary triggering signal to the controlled rectifier in the event of a fault. In response to this supplementary triggering signal, controlled rectifier 22 becomes conductive and places a short circuit between the arms of the bridge. In the event of a fault, before the voltage across secondary winding T2–2 becomes excessive, Zener diode 28 breaks down and a positive triggering signal is applied through conventional rectifier 29 to the gate of controlled rectifier 22. The low impedance path thus placed across secondary winding T2–2 holds the voltage to a very low value until the end of the half cycle is reached. When the polarity reverses during the freewheeling period, Δ, as shown in FIGURE 3, the silicon controlled rectifier is rendered nonconducting and the voltage can rise until again limited by the Zener diode circuit. The breakdown of Zener diode 28 and magnitude of the supplementary triggering impulse is controlled by adjusting the resistance values of resistors 24 and 25 and the capacitance values of capacitors 26 and 27.

The protection circuit illustrated in FIGURE 2 makes it possible to protect the generator and its excitation system even in the event of normally damaging faults. The subsequently described circuits embodying novel features of the invention do not specifically include the protection system illustrated in FIGURE 2. It will be understood, however, that this protection system may be applied in each of these circuits in order to obtain the desired results.

FIGURE 5 illustrates an embodiment of the invention wherein two silicon controlled rectifiers 31, 32, are connected across secondary T2–2 of current transformer T2. The field 20 is again supplied by a full-wave rectifier bridge as in the case of the circuits of FIGURES 1 and 2. Here, output regulation is effected by controlling the duty cycle of controlled rectifiers 31 and 32. The rectifiers are connected with opposite polarization and, therefore, control alternate half cycles of the alternating current applied to the rectifier bridge. This arrangement may be distinguished from those already considered by the fact that the alternating current supply to the bridge is shorted out rather than the direct current to the field.

For descriptive purposes, the circuitry for triggering controlled rectifiers 31 and 32 may comprise a pair of commonly energized circuits of the type shown in FIGURE 4. Terminal A of a first circuit would be connected to the gate electrode of rectifier 31, terminal A′ of a second circuit would be connected to the gate electrode of rectifier 32, and the B terminals of each circuit would be connected to the cathodes of their respective rectifiers. The input terminals C, D, would be connected across any pair of lines suppling load 14. Of course, other arrangements for sampling the output and comparing it with a desired voltage level to develop a control signal may be employed.

FIGURE 6 is a circuit schematic representing utilization of the technique shown by FIGURE 5 in combination with individual control over each phase of a three-phase generator. The arrangement of FIGURE 6 features a three-phase potential transformer T3 having a Y connected primary associated with conductors 11, 12, and 13 and a delta connected secondary. The secondary supplies power via a plurality of reactors 33, 34, and 35 to a three-phase full-wave bridge circuit 37 which supplies power to field 20. A three-phase current transformer T4 having individual primary windings T4–1C, T4–1B, and T4–1A connected in each of conductors 11, 12, and 13 respectively and a delta connected secondary also supplies power to the aforementioned three-phase bridge circuit 37. Each individual phase of the secondary of transformer T4 has a pair of controlled rectifiers connected thereacross. These rectifiers perform the same functions as discussed in conjunction with FIGURE 5 and have been shown typically in FIGURE 6 as controlled rectifiers 31 and 32 connected across secondary winding T4–2C.

In operation, the circuit of FIGURE 6 is very similar to the circuit of FIGURE 5. The distinction resides in the individual treatment of each phase of the three-phase output. The circuit elements included in FIGURE 6 permit individual regulation of each phase of the power delivered to load 14. Furthermore, the use of three-phase full-wave rectifier bridge 37 to supply field 20 establishes a more constant unidirectional current supply thereto. The amount of power delivered to the field is an amount determined by the duty cycles of the controlled rectifiers associated with each phase. These duty cycles may be controlled by triggering circuits in the manner described for the circuit in FIGURE 5. For example, triggering circuits, each individual to a particular phase, may be used to control the controlled rectifiers associated with that phase. Of course, other techniques may be substituted by those skilled in the art.

FIGURE 7 illustrates an embodiment of the invention wherein the shunting controlled rectifiers 31 and 32 are replaced by a single controlled rectifier 50. In order to accomplish this substitution, a conventional full-wave rectifying bridge comprising rectifiers 51, 52, 53, and 54 is interconnected across secondary T2–2 of current transformer T2.

The effect of controlled rectifier 50 in establishing regulatory control over the application of power to field 20 may be understood by considering the shorting action presented thereby when triggered into conduction by a voltage regulation and trigger circuit of the nature hereinbefore described. During the positive half cycle of voltage, a positive voltage is applied to field 20 in the circuit comprising reactor 15, rectifier 16, field 20, rectifier 17, and conductor 56. When controlled rectifier 50 is triggered into conduction, a short circuit is placed between conductor 55 and 56 consisting of rectifier 51, controlled rectifier 50, and rectifier 52. During the succeeding half cycle, field 20 is supplied by current in the circuit comprising rectifier 18, field 20, rectifier 19, and conductor 55. Short circuiting of the field rectifier bridge is then accomplished upon triggering of controlled rectifier 50 in the path comprising rectifier 53, controlled rectifier 50, and rectifier 54. The operation of the circuit is similar to that of FIGURE 5 and its predecessors and permits utilization of a single controlled rectifier to selectively short out the alternating current input to the field bridge rectifier.

FIGURE 8 is an extension of the circuit embodied in FIGURE 7 to a three-phase system having individual control over each phase. In the circuit of FIGURE 8 an individual bridge rectifier with a controlled rectifier element 50 is supplied across each phase of a current transformer T4 which provides current to a three-phase full-wave rectifier bridge 37. A potential transformer T3 having a Y connected primary receiving power from the output of generator 10 and a delta connected secondary delivering power via reactors 33, 34, and 35 to the aforementioned rectifier bridge 37 is illustrated. In view of the foregoing circuit description, a further description of operation of FIGURE 8 is unnecessary.

FIGURE 9 shows another circuit modification which will yield individual control over each phase of a three-phase system by means of a single controlled rectifier per phase. In the instant case, controlled rectifiers 47, 48, and 49 are associated with individual phases in three-phase full-wave rectifier bridge 37. The controlled rectifiers, as shown for example by controlled rectifier 47, are connected in parallel with one rectifier of each phase in order to produce, when triggered, a low impedance current in a direction opposing said one rectifier. In this way, the alternating current supply to each phase of the bridge is selectively short circuited.

For example, assuming the delivery of power to field 20, at some time during normal operating conditions conductor 38 will be positive with respect to either conductor 39 or 40. At this time, power is applied to field 20 via conventional rectifier 41 and is returned to the secondary of current transformer T4 and potential transformer T3 via conventional rectifiers 44 and 46. Upon triggering of the controlled rectifiers, a short circuit is established between conductor 38 and the other two conductors comprising controlled rectifier 47 and conventional rectifiers 44, 46. Consequently, no power is applied to the field 20 during the conducting interval of any controlled rectifier.

Yet another circuit arrangement embodying the principles of the present invention is illustrated in FIGURE 10. In this circuit, three current-potential transformers T5, T7, and T8 are used, each of which consists of three windings; a current primary, a potential primary, and a secondary. Each transformer has its primaries connected to a different phase of the three-phase output from generator 10 and the secondaries of each transformer are connected in delta to supply three-phase power to full-wave rectifier bridge 37.

The individual potential primary windings T5–1P, T7–1P, and T8–1P are connected in a Y configuration and the free ends thereof are connected to line 11, 12, or 13 via reactors 35, 34, and 33, respectively. The current primary windings T5–1C, T7–1C, T8–1C are connected in series with lines 11, 12, and 13 respectively. Thus, the combined effect of the output voltage and current in each phase is effective via magnetic coupling to induce a voltage in the secondary winding thereof that is representative of the output in that phase. Then, the total output effect is used to supply field excitation by the delta connection of these secondaries and the application of the voltage induced therein to three-phase bridge 37.

FIGURE 11 illustrates the use of the principles taught herein in conjunction with a rotating exciter arrangement. The basic operating principles are the same; however, the output of the basic generator 10 is used to supply the excitation for a field 61 of a rotating exciter 62. The output of the exciter armature 60 supplies power to the basic generator field 20.

In recapitulation, the present invention teaches means for using controlled rectifiers for controlling the excitation of self-excited generators. Numerous embodiments have illustrated the features of the invention and adaptations thereof.

While the above described circuits constitute particular embodiments of the invention it will, of course, be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. A generator field excitation system comprising, means for continuously applying exciting current to said field, means connected to the output of said generator and operative to produce a control pulse during each cycle of normal generator operation, each control pulse being positioned in time in accordance with the deviation of the output power from a preselected value, and means operative in response to said control pulses to short circuit the exciting current applied to said field for a portion of each cycle of normal generator operation.

2. A generator field excitation system comprising, rectifying means coupled to supply direct current to said field, inductive means interconnecting the output of said generator to said rectifying means, regulating means coupled to the output of said generator and producing a control pulse during each cycle of normal generator operation, each control pulse being positioned in time in accordance with the deviation of said output from a preselected magnitude, and means to short circuit the current supplied to said field for a portion of each cycle in response to said control pulse.

3. A generator field excitation system comprising, first means connected across the output of said generator for supplying power to said field in accordance with the generator output voltage, second means connected in series with the output of said generator for supplying power to said field in accordance with the generator output current, regulating means connected to the output of said generator and operative to produce a control pulse during each cycle of normal generator operation, each control pulse being positioned in time in accordance with the deviation of said output from a preselected magnitude, and means operative in response to said control pulses to place a substantial short circuit across said field for a portion of each cycle of normal generator operation.

4. A circuit for providing controlled direct current to a load from a source of alternating current comprising, rectifying means coupled to supply direct current to said load, inductive means coupling said source of alternating current to said rectifying means, means connected to said source of alternating current to produce a control signal during each cycle of normal operation of said source of alternating current, each control signal being positioned in time in accordance with the deviation of said alternating current from a predetermined value, and controlled means operative in response to the control signals to substantially short circuit the current supplied to said load for a portion of each cycle of alternating current.

5. A circuit as defined by claim 4 wherein said control signals are time-position modulated pulses and said controlled means are normally nonconducting means triggered into conduction by said pulses to provide a low impedance path across said load.

6. A circuit as defined by claim 4 wherein said control signals are time-position modulated pulses and said controlled means are normally nonconducting means triggered into conduction by said pulses to place a substantial short circuit across the input of said rectifying means.

7. A circuit as defined in claim 4 further including means connected in parallel with said load and operative when the voltage thereacross exceeds a predetermined magnitude to apply a control signal to said controlled means.

8. A generator field excitation system comprising, rectifying means coupled to supply direct current to said field, inductive means coupling the output of said generator to said rectifying means and supplying power therethrough in accordance with the magnitude of the generator output, regulating means coupled to said generator output to produce a control signal during each cycle of normal generator operation, each control signal being positioned in time in accordance with the deviation of said output from a preselected magnitude, and normally nonconducting means connected across said rectifying means and rendered conductive to provide a substantially zero impedance path thereacross in response to each control signal for a portion of each cycle of generator output.

9. A generator field excitation system as defined in claim 8 further including means connected in parallel with said field and operative when the voltage thereacross exceeds a predetermined magnitude to apply a control signal to said normally nonconducting means.

10. A generator field excitation system comprising, a full-wave rectifier, first means responsive to said generator output for supplying an alternating voltage to said rectifier proportional to the current output of said generator, second means responsive to said generator output for developing an alternating voltage proportional to the voltage output of said generator, inductive means coupling the output of said second means to said full-wave rectifier, means coupling the output of said full-wave rectifier to said field, regulating means connected to the output of said generator to produce a control signal during each cycle of normal generator operation, each control signal being positioned in time in accordance with the deviation of said output from a preselected magnitude, and normally nonconducting means connected across said full-wave rectifier and operative to conduct and provide a low impedance path thereacross for a portion of each cycle of generator output in response to said control signals.

11. A generator field excitation system comprising, rectifying means coupled to supply direct current to said field, inductive means coupling the output of said generator to said rectifying means and supplying power therethrough in accordance with the magnitude of the generator output, a controlled rectifier connected across said field and oriented to experience a forward-biasing potential when power is applied to said field, and regulating means connected to the output of said generator and operative to render said controlled rectifier conductive during each cycle of normal generator operation at a time commensurate with the deviation of said output from a preselected magnitude to substantially short circuit said direct current.

12. A generator field excitation system comprising, rectifying means coupled to supply direct current to said field, inductive means coupling the output of said generator to said rectifying means and supplying power therethrough in accordance with the magnitude of the generator output, oppositely polarized controlled rectifiers connected across the input to said rectifying means, and regulating means connected to the output of said generator and operative to render said controlled rectifiers conductive during alternate half cycles of normal generator operartion at times commensurate with the deviation of said output from a predetermined magnitude.

13. A generator field excitation system comprising, rectifying means coupled to supply direct current to said field, inductive means coupling the output of said generator to said rectifying means and supply power therethrough in accordance with the magnitude of the generator output, a full-wave rectifier having its input connected in parallel with the input of said rectifying means and its output connected across a normally nonconducting controlled rectifier, and regulating means connected to the output of said generator and operative to render said controlled rectifier conductive during each cycle of normal generator operation at times commensurate with the deviation in magnitude of said generator output from a predetermined value.

14. A control system comprising, a first generator, a second generator, means connected to the output of said second generator for supplying the field of said first generator, means connected to the output of said first generator for supplying the field of said second generator, regulating means connected to the output of said first generator to produce a control signal during each cycle of normal generator operation, each control signal being positioned in time in accordance with the deviation of the output of said first generator from a preselected magnitude, and means operative in response to said control signals to substantially short circuit the supply to the field of said second generator.

15. In a field excitation system for a polyphase generator, a polyphase rectifier providing a direct current output in response to a polyphase input, a plurality of inductances, each of said inductances connecting one phase of said generator output to one phase of the input of said polyphase rectifier, means connecting the output of said polyphase rectifier to said field, regulating means connected to the output of said generator and operative to produce an individual control signal during each cycle of normal generator operation for each phase, each control signal being positioned in time in accordance with the deviation in magnitude of each phase voltage from a predetermined value, and control means individual to each phase of said polyphase rectifier and operative in response to the control signals for their respective phases to create a substantial short circuit across the associated phase of said polyphase rectifier.

16. A field excitation system as defined in claim 15 wherein said control means comprise normally nonconducting oppositely polarized controlled rectifiers connected in parallel with individual phase inputs of said polyphase rectifier.

17. A field excitation system as defined in claim 15 wherein said control means comprise a plurality of full-wave rectifiers each having its input connected in parallel with an individual phase input of said polyphase rectifier and its output connected across a normally nonconducting controlled rectifier, each of said controlled rectifiers being rendered conductive in response to the control signals generated for its respective phase by said regulating means.

18. In a field excitation system for a polyphase generator, power translating means having voltage and current inputs and operative in response to the combined power of said inputs to produce an output proportional thereto, a plurality of inductances, each of said inductances connecting one phase of the output of said generator to a voltage input of said power translating means, means serially connecting each phase of the output of said generator with a current input of said power translating means, a polyphase rectifier providing a direct current output in response to a polyphase input, means connecting the output of said power translating means to the input of said polyphase rectifier, means connecting the output of said polyphase rectifier to said field, regulating means connected to the output of said generator to produce an individual control signal during each cycle of normal generator operation for each phase, each control signal being positioned in time in accordance with the deviation in magnitude of each phase voltage from a predetermined value, and control means individual to each phase of said polyphase rectifier and operative in response to the control signals for their respective phases to place a substantial short circuit across the particular phase output associated therewith.

References Cited
UNITED STATES PATENTS

| | | | |
|---|---|---|---|
| 3,027,509 | 1/1962 | Lamaster | 322—25 |
| 3,032,701 | 1/1962 | Krauz | 322—25 |
| 3,217,229 | 11/1965 | Ballard | 322—25 X |
| 3,226,626 | 12/1965 | Moore | 322—73 X |

MILTON O. HIRSHFIELD, *Primary Examiner.*

J. J. SWARTZ, J. D. TRAMMELL, *Assistant Examiners.*